(12) United States Patent
Kauffman et al.

(10) Patent No.: US 8,395,521 B2
(45) Date of Patent: Mar. 12, 2013

(54) SMART AEROSPACE STRUCTURES

(75) Inventors: Robert E. Kauffman, Centerville, OH (US); J. Douglas Wolf, Kettering, OH (US)

(73) Assignee: University of Dayton, Dayton, OH (US)

( * ) Notice: Subject to any disclaimer, the term of this patent is extended or adjusted under 35 U.S.C. 154(b) by 396 days.

(21) Appl. No.: 12/701,056

(22) Filed: Feb. 5, 2010

(65) Prior Publication Data
US 2010/0295694 A1    Nov. 25, 2010

Related U.S. Application Data

(60) Provisional application No. 61/150,417, filed on Feb. 6, 2009.

(51) Int. Cl.
*G08B 21/00* (2006.01)
*G08B 13/14* (2006.01)
*G08B 1/08* (2006.01)
*G05B 19/00* (2006.01)
*H01Q 15/14* (2006.01)

(52) U.S. Cl. ............... 340/665; 340/572.1; 340/10.1; 340/568.2; 340/539.13; 455/410; 343/916

(58) Field of Classification Search .................. None
See application file for complete search history.

(56) References Cited

U.S. PATENT DOCUMENTS

| | | | | |
|---|---|---|---|---|
| 5,646,592 | A * | 7/1997 | Tuttle | 340/545.6 |
| 6,958,698 | B2 * | 10/2005 | Maloney | 340/572.8 |
| 2006/0092028 | A1 * | 5/2006 | Lerch et al. | 340/572.8 |
| 2007/0146142 | A1 * | 6/2007 | Cote | 340/572.8 |
| 2007/0152822 | A1 * | 7/2007 | Eren et al. | 340/572.1 |
| 2007/0152829 | A1 | 7/2007 | Lindsay et al. | |
| 2008/0061972 | A1 | 3/2008 | Hwang et al. | |
| 2008/0231289 | A1 | 9/2008 | Ganesh et al. | |
| 2010/0289662 | A1 * | 11/2010 | Dasilva et al. | 340/686.6 |
| 2011/0215156 | A1 * | 9/2011 | Johnson et al. | 235/492 |
| 2011/0254665 | A1 * | 10/2011 | Lindsay et al. | 340/10.5 |

FOREIGN PATENT DOCUMENTS

WO    WO2008075232    6/2008

OTHER PUBLICATIONS

Wessel, Saudi Arabian Jeweler Puts a High Value on RFID, RFID Journal, http://www.rfidjournal.com/article/print/4451, Nov. 19, 2008.
Collins, E-Passport Tag Comes With Switch, RFID Journal, http://www.rfidjournal.com/article/print/2361, May 23, 2006.

* cited by examiner

*Primary Examiner* — Jennifer Mehmood
*Assistant Examiner* — Fekadeselassie Girma
(74) *Attorney, Agent, or Firm* — Dinsmore & Shohl LLP (57) ABSTRACT

Smart aerospace structures are described herein utilizing a deactivated RFID tag including an IC and an electrical by-pass. The electrical by-pass is conductive and the electrical by-pass is in parallel with the IC such that the deactivated RFID becomes activated upon an abnormal condition, such as an improper clamp installation, a clamp failure, an impact, a thermal event or a crack.

5 Claims, 7 Drawing Sheets

SMART AEROSPACE STRUCTURES

CROSS-REFERENCE TO RELATED APPLICATIONS

This application claims the benefit of U.S. Provisional Application No. 61/150,417, filed Feb. 6, 2009, entitled SMART CLAMP FOR USE WITH WIRING BUNDLES. The entire contents of said application is hereby incorporated by reference.

GOVERNMENT RIGHTS

The government has rights in the invention pursuant to Contract No. 2006-G-015/Grant 08-G-001 awarded by the FAA.

TECHNICAL FIELD

The invention relates to a structure for use with aerospace structures, and more particularly, to a "smart" structure which includes sensors or deactivated Radio-frequency identification (RFID) tags in conjunction therewith which allow detection of abnormal conditions.

BACKGROUND

Structures such as, but not limited to clamps are often used to support large numbers of wiring bundles, polymeric hoses, metal tubes, and the like which are present, for example, on aircraft, ships, ground vehicles, and industrial equipment. Such clamps are typically formed from plastic or molded rubber and may have an inner metallic frame for support. Over time, vibrations, abrasion, hydrolysis, fatigue, chemical reactions, or combinations thereof result in degradation of the clamps, the supported materials, and any associated connectors. When clamps break due to such degradation or due to shock, the resulting excessive vibration greatly accelerates the degradation mechanisms of the supported materials and connectors. For example, where the supported materials comprise wiring bundles, in extreme cases, clamp failure can result in unsupported wiring bundles swinging against sharp edges, leading to arcing when the conductors become exposed due to abrasion/cutting of the wiring insulation.

It is also known that improper clamp installation may lead to damage of the supported materials. It would be desirable to be able to monitor proper installation of clamps as well as determine when damage has occurred to a clamp or supported materials.

Accordingly, there is a need in the art for a device and method which permits easy monitoring of aerospace structures.

SUMMARY

Embodiments of the invention meet the above mentioned need by providing a self-diagnostic, or "smart" aerospace structure which can be used to support various materials such as wiring bundles in aircraft, ships, ground vehicles, and industrial equipment or as components of an airframe such as fuselage, wings, tail, doors, and interior. The structure includes deactivated RFID tags which are either embedded in the structures or placed on the surface of the structures. The deactivated RFID tags activate to provide a signal when the structure is in an abnormal condition such as, but not limited to, a broken clamp to indicate that necessary maintenance should be performed to prevent further damage to the associated material and connectors supported by the clamp.

According to an embodiment of the invention, a smart aerospace structure comprises a deactivated RFID tag comprising an IC and an electrical by-pass, where the electrical by-pass is conductive, the electrical by-pass is in parallel with the IC and wherein the deactivated RFID becomes activated when the by-pass becomes non-conductive upon an abnormal condition; where the abnormal condition comprises an improper clamp installation, a clamp failure, an impact, a thermal event or a crack.

According to another embodiment of the invention, the smart aerospace structure comprises a clamp body with a first mating surface and a second mating surface. In this embodiment, the abnormal condition comprises an improper clamp installation or a clamp failure, and the electrical by-pass is embedded in a clamp body for supporting electrical wiring. When the first mating surface and the second mating surface are in contact, the clamp body is in a closed position, the clamp body forms an enclosure, and the electrical by-pass is conductive. When the first mating surface and the second mating surface are separated, the clamp body is in an open position, and the electrical by-pass is nonconductive.

According to yet another embodiment of the invention, the abnormal condition comprises an impact and the electrical by-pass comprises a breakable trace configured to break upon impact, such that when the breakable trace breaks, the electrical by-pass is nonconductive.

According to yet another embodiment of the invention disclosure, the abnormal condition comprises a thermal event. In this embodiment, the electrical by-pass comprises a reactive material configured to react to chemical species resulting from the thermal event, and when the reactive material reacts, the electrical by-pass is nonconductive. In an alternative embodiment, the electrical by-pass comprises a melting material configured to melt during the thermal event, wherein when the melting material melts, the electrical by-pass is nonconductive.

According to a further embodiment of the invention, the smart aerospace structure comprises a composite material, and the abnormal condition comprises a crack in the composite material. The electrical by-pass may comprises a breakable trace configured to break upon the formation of a crack in the composite material, wherein when the breakable trace breaks, the electrical by-pass is nonconductive.

Accordingly, embodiments of the invention selectively generate signals when the structure is in an abnormal condition such as, for example, a damaged or broken clamp, an improperly installed clamp, impact damage to a structure, a cracked structure, exposure to a thermal event, and the like. Other features and advantages will be apparent from the following description and the accompanying drawings.

BRIEF DESCRIPTION OF THE DRAWINGS

The following detailed description of specific embodiments of the present disclosure can be best understood when read in conjunction with the following drawings, where like structure is indicated with like reference numerals and in which.

The embodiments set forth in the drawings are illustrative in nature and not intended to be limiting of the invention defined by the claims. Moreover, individual features of the drawings and invention will be more fully apparent and understood in view of the detailed description.

DETAILED DESCRIPTION

As used herein with the various illustrated embodiments described below, the following terms include, but are not limited to, the following meanings.

The term "electrical wiring" means any conductor used to carry electricity, which conductor may include an insulating material or protective covering thereon.

The term "trace" means any conductor used to carry electrons, which conductor may be imprinted upon a surface or embedded within a material.

The term "deactivated" means that an RFID tag is unreadable utilizing an RFID reader from a predetermined distance. The predetermined distance may be any desired distance from the RFID tag conforming to a test procedure such as for example, 1 inch, 3 inches, 6 inches, 1 foot, 10 feet, 20 feet, and the like.

The term "impact" means that the smart structure is subjected to an energy that is capable of having a detrimental effect on an aerospace structure upon a single occurrence or multiple occurrences such as for example, a shock, a hard landing, turbulence, and the like.

The term "thermal event" means that the smart structure is subjected to a predefined temperature that is desired to be monitored.

The term "crack" means a void or impurity within a structure or on the surface of a structure such as for example, an inclusion, a nick, a scratch, a gap, and the like.

The term "conductive" means a material capable of transmitting electrons along the material when an electric potential difference is applied across the material.

The term "nonconductive" means a material which is incapable of transmitting electrons along the material when an electric potential difference is applied across the material, or which transmits electrons along the material when an electric potential difference is applied across the material with substantial loss of energy such as for example, an insulator, an open circuit, a lack in continuity, an air gap, and the like.

The smart structures of the invention include deactivated RFID tags in conjunction with an aerospace structure and are used for self-diagnostics. Thus, if the structure breaks or is damaged, the deactivated RFID tags become active to provide an indication of the damage so that necessary repairs can be made. The deactivated RFID tags can also activate to indicate if supported material is damaged by an improperly installed clamp or by extended use.

Figure 1:
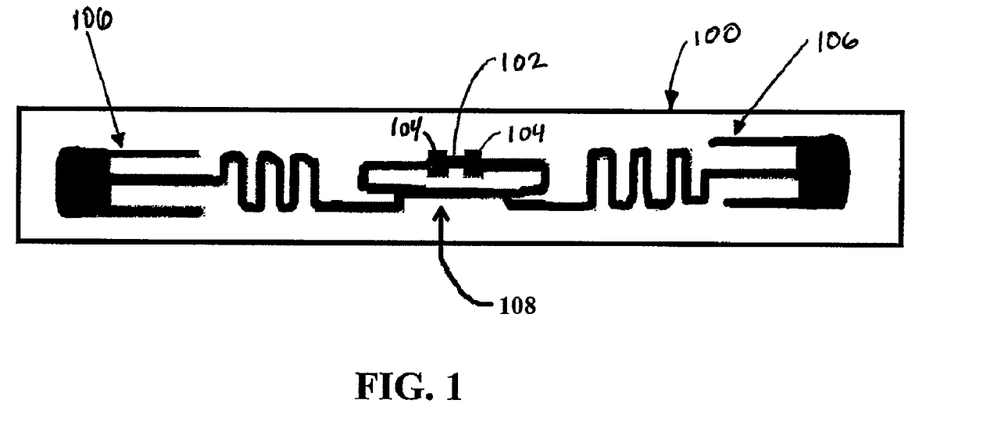
FIG. 1 depicts a schematic illustration of an RFID tag according to an embodiment of the invention.

Referring to FIG. 1, an RFID tag 100 comprises an integrated circuit (IC) 102 in electrical communication with IC pads 104, and at least one antenna 106. The IC 102 comprises identification information that may be transmitted via the at least one antenna 106. The RFID tag 100 may be passive, i.e. configured to transmit the identification information utilizing energy received from a radio transmission, or active, i.e. configured to transmit identification information without the need for external stimulation. It is noted that, the maximum transmission distance of the RFID tag 100 is dependent on tag and reader designs. Thus, while the descriptions contained herein describe maximum read distances in the 10-20 feet range, embodiments of the present disclosure should not be so limited.

Figure 2A:
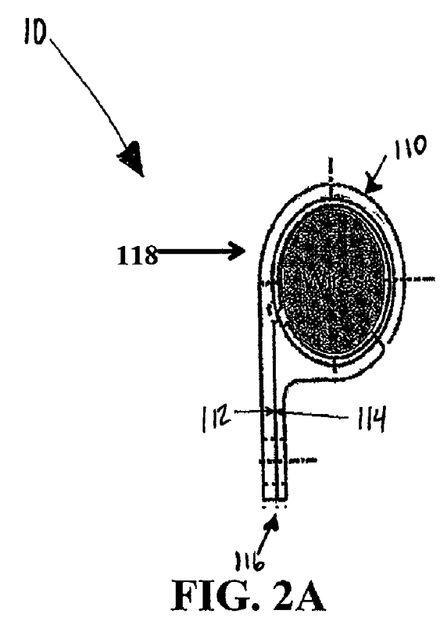
FIG. 2A depicts a schematic illustration of a smart structure according to another embodiment of the invention.
Figure 2B:
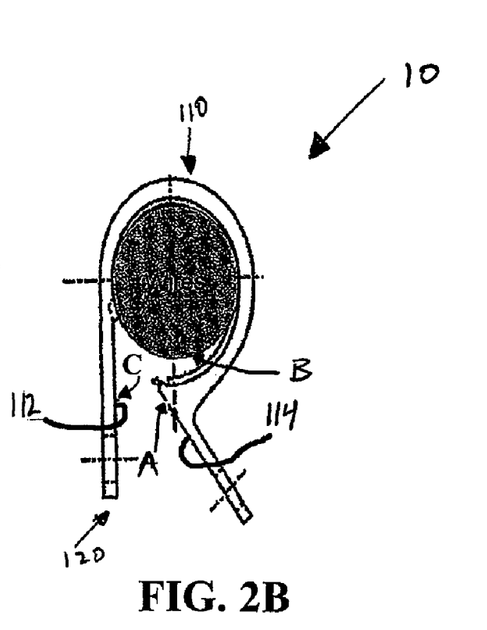
FIG. 2B depicts a schematic illustration of a smart structure according to another embodiment of the invention.

One embodiment of the smart aerospace structure 10 is clamp 110, shown in FIGS. 2A and 2B, including a deactivated RFID tag (not shown). The clamp 110 may be comprised of conventional materials such as plastic and/or metal. The clamp 110 may be made conductive by printing metal traces on its surface or by molding metal wires into its body. In this embodiment, the clamp 110 may be constructed as one component where the deactivated RFID tag 130 (FIGS. 3, 5, 6, and 7) is embedded in the clamp 110.

The clamp 110 (FIGS. 2A and 2B) comprises a first mating surface 112 and a second mating surface 114. When the mating surfaces 112 and 114 are in contact, the clamp 110 is in a closed position 116 and forms an enclosure 118. The enclosure 118, not shown, may support any number of wiring bundles, polymeric hoses, metal tubes, and the like which are present. When the mating surfaces 112 and 114 are separated, the clamp 110 is in an open position 120 which causes the deactivated RFID tag to activate, i.e. become readable.

The RFID tag 100 (FIG. 1) may become a deactivated RFID tag 130 (FIGS. 3, 5, 6, and 7) through a number of different methods. The clamp 110 (FIGS. 2A and 2B) may include an electrical by-pass 132, for example a circuit loop that forms a circuit in parallel to the IC 102 and forms a closed circuit in the closed position 116 and an open circuit in the open position 120. When such a loop is conductive the deactivated RFID tag 130 is readable (passive tag) or generates a signal (active tag) only when the clamp opens or supported material is damaged or broken. While clamps are discussed herein, it is noted that cable ties may be used in the same manner as clamps in conjunction with RFID tags.

In addition to the methods described hereinabove, several further methods of deactivating the RFID tag may be used. In one method, an RFID tag with two antennas may be bent such that the antennas are touching. In a further method, an RFID tag with a loop 108 may be deactivated by placing a conducting foil 140 (FIG. 7) on top of the loop 108. In cases where the clamp is attached to a metal surface, adhering the RFID tag to the opposite side of the clamp would be able to detect clamp separation from its support, i.e., metal surface pressed against the loop of an RFID tag, in a manner analogous to the foil 140, to lower read range. A smart aerospace structure incorporating any of the RFID tags described herein may be used to determine proper clamp alignment and installation and to detect clamp failure during use.

Figure 3:
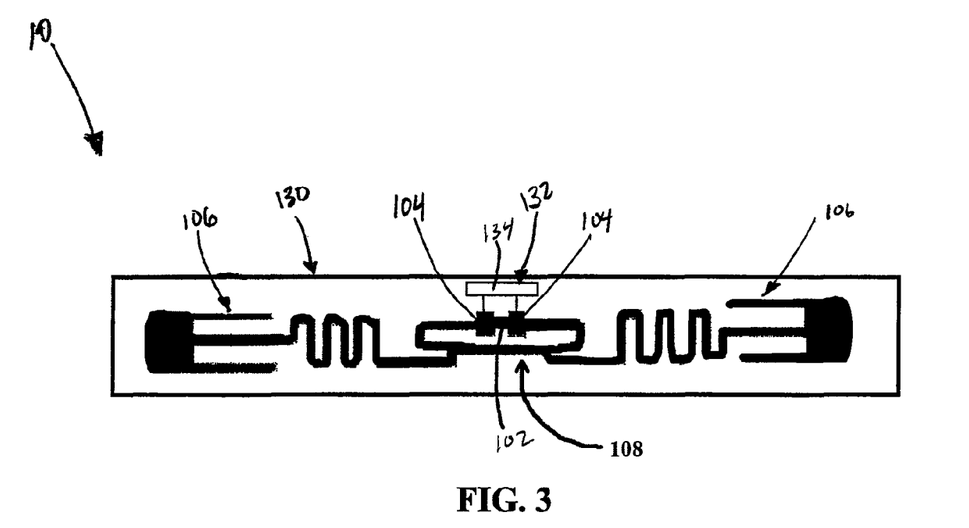
FIG. 3 depicts a schematic illustration of a deactivated RFID tag according to another embodiment of the invention.

Referring again to the embodiment shown in FIG. 3, the electrical by-pass 132 comprises a breakable trace 134. The breakable trace 134 may comprise any conducting material configured to break permanently upon an impact, e.g., the shock of monitored material hitting against a structure breaks the trace permanently and the RFID tag is readable, indicating that an impact has occurred since the last time the sensor was scanned by the reader (RFID tag is undetectable when trace is intact).

For further illustration, the following example is provided. Once a clamp failure is indicated in an aircraft application, the importance of clamp failure is dependent upon the environment of the unsupported wire harness. If the unsupported harness simply lies on the floor or is held in place by surrounding components, then the clamp failure is of minimal consequence and can be repaired during routine maintenance. However, if the unsupported wire harness is swinging up against aircraft structures/edges, then the repair needs to be performed as soon as possible to prevent insulation failure and eventual arcing events. Since the impact events occur during flight/landing, the sensor needs to undergo a permanent change to indicate the in-flight impact event to maintenance personnel.

Figure 4:
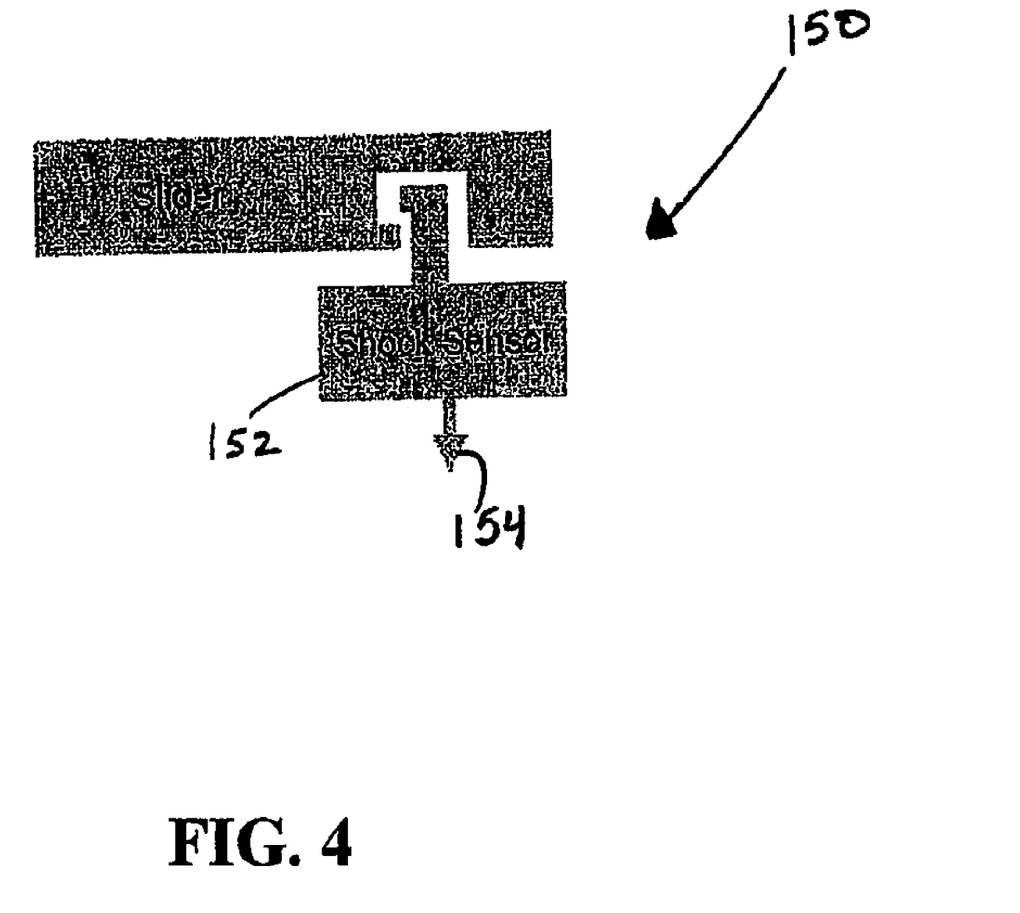
FIG. 4 depicts a schematic illustration of a shock sensitive switch for use with a smart structure according to an embodiment of the invention.

Thus, the breakable trace 134 may comprise any impact sensor. For example, the breakable trace 134 may include a miniature shock triggered switch 150 that changes from closed to permanently open during impact events such as the switch shown in FIG. 4. The miniature shock triggered switch 150 may comprise a moving element 152 that moves in a shock direction 154 to cause a switch between a closed circuit and an open circuit.

Figure 5:
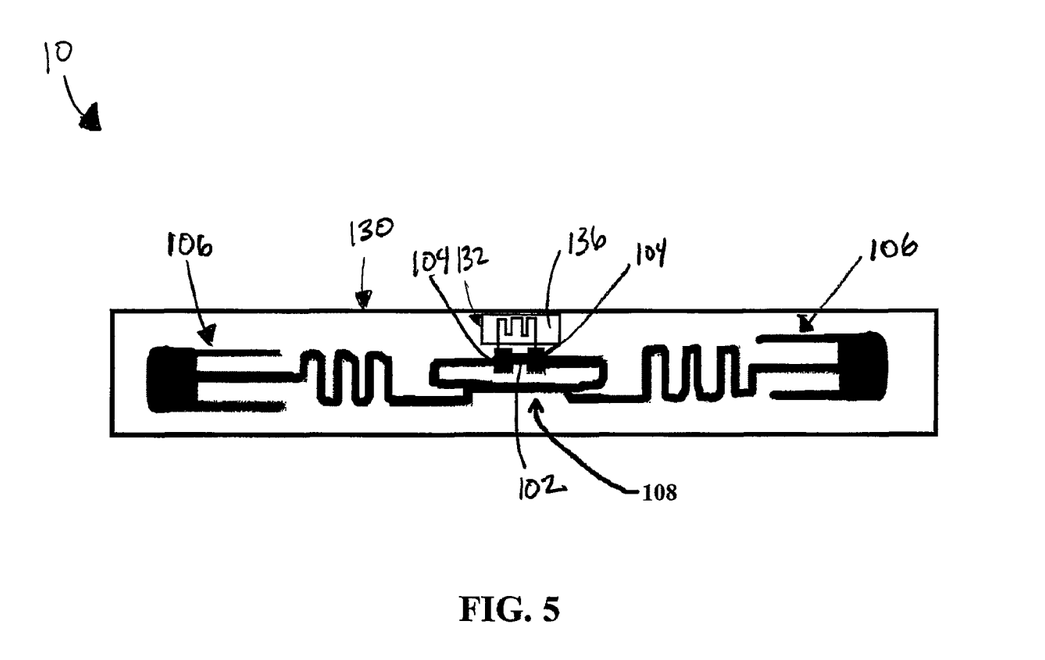
FIG. 5 depicts a schematic illustration of a deactivated RFID tag according to an embodiment of the invention.

The deactivated RFID tags 130 can be used as a thermal event sensor, i.e., an increase above a specified temperature of monitored material due to smoldering fire, arcing, hot spots, etc. causing a permanent indication (e.g. an open circuit) that a thermal event has occurred since the last time the sensor was scanned by the reader. As depicted in FIG. 5, embodiments of the electrical by-pass 132 may comprise a reactive material configured to react (corrosion produces electrical opening in IC by-pass) to chemical species resulting from thermal events such as overheated wires, shorts/fires, arcing, etc, e.g., reactive/oxidizing chemical species (phenols, carboxylic acids, hydroperoxides, etc.).

For lower temperature applications (<150° C.), the electrical by-pass 132 may comprise a melting material. For example, a low melting point polymer substrate 136 is suitable, e.g., a polyethylene film that melts between 100° C. to 130° C. with a vapor deposited/printed metal trace or loaded with metal particles to make the polyethylene conductive. For higher temperature applications, low temperature melting metals (e.g., indium) and non-lead solders (96% tin/4% silver) may be used to form the electrical by-pass 132 on a high temperature RFID tag surface (e.g., polyimide, alumina, ceramic, etc.).

Figure 6:
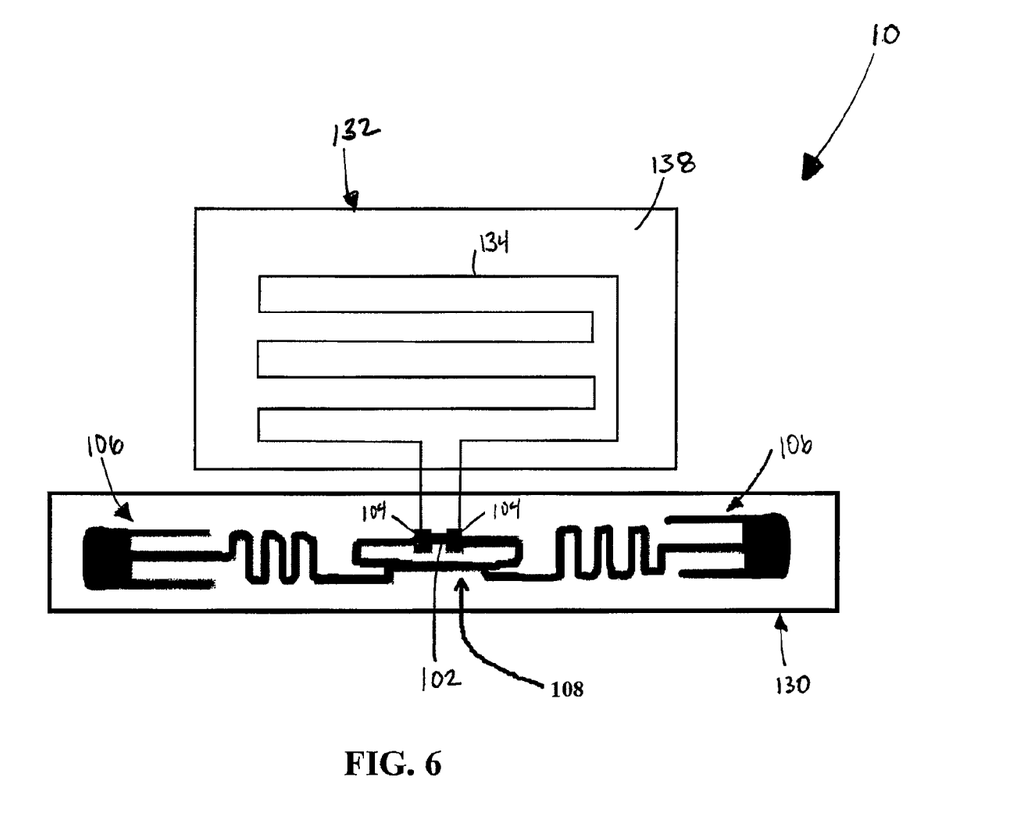
FIG. 6 depicts a schematic illustration of a deactivated RFID tag according to an embodiment of the invention.

In further embodiments, as depicted in FIG. 6, smart aerospace structures 10 may be used as a crack indicator for a part 138 comprising for example, a composite material, or other materials. The electrical by-pass 132 may comprise a breakable trace 134 configured to cause a break in the electrical by-pass when a crack is formed in the material surface/subsurface, permanently indicating that a crack has occurred since the last time the sensor was scanned by a reader.

RFID tags used with the smart aerospace structure 10 do not require access points and only the RFID tag with a trace(s) that has been cracked/damaged is readable, i.e., a single scan can detect one damaged trace (crack occurred somewhere along length of affected trace) among a thousand completed traces. If the different layers of composite or other materials printed with traces are assembled with the traces alternating between horizontal and vertical, a single scan can be used to locate the crack and determine its size and depth from the information gathered from the affected RFID tags.

It should be appreciated that it is also possible to provide combination sensors such as a smart aerospace structure 10 having both clamp breakage and impact detection or a smart aerospace structure 10 having both impact and thermal detection. Such combination sensors may be constructed by adding two, or more, by-pass circuits and an additional IC to the same loop of a RFID tag, i.e., the IC(s) may be coded to indicate the type and location of the abnormal condition.

While RFID tags have been described herein primarily in connection with clamps and wiring applications, it should be appreciated that they may also be used in anti-tampering applications. In another application, electrical components encased in a polymer may have an inner surface covered with metal traces such that an entire stack of circuit boards, with each board encased in the sensor could be quickly scanned to determine if any of the boards (breaking nearby trace(s) activates RFID tag(s)) have been compromised. The sensor may also be used as an anti-tampering wrap for medicines or medical records. For anti-tampering systems involving pressure release, a pressure switch could be used to indicate tampering. As with the other "smart" sensors, only RFID tags activated by tampering would be readable so that one tampered item may be quickly identified among thousands of untampered items.

In order that the invention may be more readily understood, reference is made to the following examples which are intended to illustrate the invention, but not limit the scope thereof.

EXAMPLE 1

Methods to form a deactivated RFID tag for use as a sensor in a clamp were tested. An Alien UHF 902.75 MHz-927.25 MHz Gen 2 RFID reader with an integrated antenna (Model 9650) was purchased for use with a laptop computer along with 100 Alien Gen2 Squiggle RFID tags for modification (FIG. 1). The Squiggle RFID tag was selected due to its size (97 mm by 11 mm), read range of 10 feet, accessibility of IC circuit and reprogrammability. RFID tags of different sizes, activation frequencies, read ranges, geometries, etc. and hand-held and stationary readers also would have been suitable for use. The flexible Alien RFID tag had a paper backing that was coated with a thin layer of clear plastic to protect the copper traces from corrosion and a sticky adhesive surface which was removed with acetone.

In the first method of RFID tag deactivation, the RFID tag was bent to form a closed "C" so that a first antenna end was pressed against a second antenna end. When the antenna paper ends were brought together, the read range remained unchanged approximately 10 feet. Only when antenna ends were aligned and pressed together with finger pressure did the read range decrease to less than 1 foot. As soon as the pressure was released, the RFID tag read range increased back to the original 10 feet.

Figure 7:
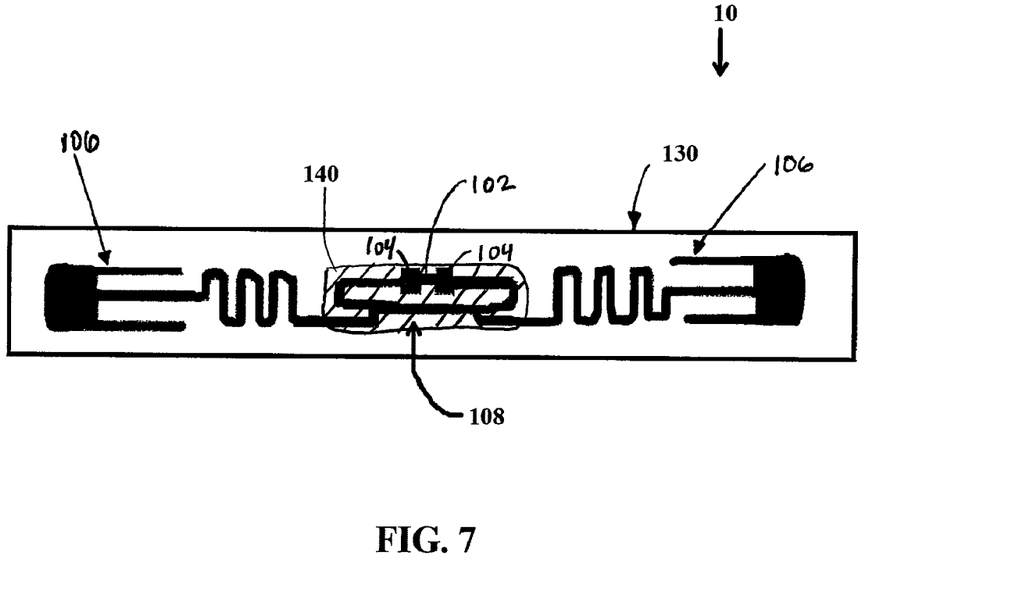
FIG. 7 depicts a schematic illustration of a deactivated RFID tag according to an embodiment of the invention.

In another method, a metal foil 140 was placed on top of the loop 108 (see FIG. 7). While metal foil 140 was used, it is noted that different metal/nonmetal foils would have been suitable for use including, but not limited to, aluminum, iron, steel, copper, and graphite. When the foil 140 was pressed against the loop with finger pressure, the read range decreased to below 3 inches. Releasing the pressure on the foil 140, the read range increased back to the original 10 feet.

In a third method of deactivation, another loop was attached to the IC pads. A soldering iron was used to melt away the plastic film and electrical contact was made with the Cu surfaces of the IC pads. Regardless of the switch type used to complete the additional IC loop, when the switch was closed, the RFID tag was not readable at any distance and when the switch was open, the tag was readable up to the original 10 feet.

EXAMPLE 2

Clamps were constructed using the three RFID tag deactivation methods of Example 1. For the initial work, aerospace support clamps (NMC CL141N-R12, Nylon 6/6, qualified to MS25281-R) were used to demonstrate and evaluate the positioning of the modified RFID tags to produce smart aerospace structures 10 having different functions.

The first clamp was constructed using an RFID tag deactivated by the "bending" method. The adhesive on the Squiggle RFID tag was used to adhere antenna ends to a first mating surface 112 and a second mating surface 114 (FIG. 2A) so that the antenna ends would be aligned and pressed together by closing the clamp. When the clamp was open or partially closed, the read range of the RFID tag was approximately 10 feet. When the clamp was held closed by finger pressure, the read range was below 6 inches. Consequently, the clamp configuration based on bending the RFID tag to determine proper clamp alignment/installation and detect clamp failure at the support bolt during use was successfully tested.

A clamp based on a metal foil covering the RFID tag loop was constructed by using the adhesive on the Squiggle RFID tag to adhere the loop section of the tag to clamp point A (FIG. 2B) perpendicular to the clamp and using a silicone adhesive to adhere a piece of Cu foil to point C so that the tag loop and Cu foil were aligned and pressed together by closing the clamp. When the clamp was open or partially closed, the read range of the RFID tag was approximately 10 feet. When the clamp was held closed by finger pressure, the read range was below 1 inch. Thus, the clamp configuration based on the metal foil covering the loop of the RFID tag to determine proper clamp alignment/installation and detect clamp failure at the support bolt during use was successfully tested.

A third clamp was constructed based on electrical by-pass of the RFID tag IC by adding a metal trace/switch to the RFID which is independent of the clamp design. The loop/switch was positioned in three different positions: on the tag surface next to the IC, directly on top of the IC and on the opposite side of the RFID tag directly below the IC. In each case, a soldering iron was used to burn away the plastic film to make an electrical connection to the front/back surfaces of the IC pads.

The switch technology used in the initial constructions utilized the polymer matrix of Quantum Tunneling Composite (QTC), a compressible silicone polymer filled with metallic nanoparticles manufactured by Peratech (Darlington, UK). The resistance of the QTC decreased with pressure (uncompressed>$10^8$ ohm, compressed<1 ohm) because the distance between adjacent metallic particles decreased as the polymer matrix is compressed. Since the electrical conduction was based on quantum tunneling, the resistance decreased in a linear fashion. QTC was available as a pill (3×3×1 mm square) and required a conductive silicon adhesive to make a flexible, adherent electrical contact between the pill and IC pad metallic surfaces. Multiple switches were constructed from the QTC pill and steel coupon (3×3×0.5 mm): a switch which utilized only the QTC pill to make an electrical connection between the pads; and switches with a steel coupon adhered to the surface of the QTC pill that was not in contact with the pads.

For switches which utilized only the QTC pill to make the electrical connection between the IC pads, the entire QTC pill needed be compressed completely for the switch to be closed. In switches which utilized a steel coupon (conductive silicone adhesive used to adhere to pill surface), the steel coupon worked to distribute the pressure evenly across the entire QTC pill and provided a secondary conductive path. Consequently, the steel coupon/QTC switches required pressure applied over a much smaller area (>0.1 mm) for closure than the QTC pill switches (>2 mm). QTC pill only switches were suitable only for clamps whereas steel coupon/QTC switches were suitable for both clamps and cable ties.

To evaluate the different switch designs, the modified RFID tags were placed at clamp positions A and B (FIG. 2B). Due to the thickness of the QTC pill, the clamp could not be closed fully when the RFID tag was placed in position A. Also, the RFID tag was unreadable when the clamp applied pressure to the switch, i.e., the sensor could not distinguish between closed and slightly opened clamp. A metal-backed, 0.05 mm thick QTC pill (would not become conductive until clamp totally closed) or other thin, pressure sensitive switch, e.g., metal dome switch would allow the deactivated RFID tag to be placed at clamp position A.

A bundle of wires was then placed inside an opened clamp and the switches were placed parallel with the wire bundle and/or glued to clamp position B. The RFID was unreadable when the clamp was closed and had a read range of approximately 10 feet when the clamp was opened. In position B, the RFID tag was sensitive to wire bundles breaking through the clamp curved portion as well as clamp opening (caused gap between wires and clamp surfaces).

RFID tags with steel coupons became unreadable when placed on a wire bundle and a 2 mm wide cable tie tightened to close the switch. Whereas, QTC based switches had to be positioned perfectly, i.e., tie exactly between IC pads to become unreadable upon tie closure.

Having described the invention in detail and by reference to preferred embodiments thereof, it will be apparent that modifications and variations are possible without departing from the scope of the invention.

What is claimed is:

1. A smart aerospace structure comprising:
    a deactivated Radio-frequency identification (RFID) tag comprising an integrated circuit (IC) and an electrical by-pass wherein:
        the electrical by-pass is conductive, and
        the electrical by-pass is in parallel with the IC; and
    a clamp body having a first mating surface and a second mating surface, wherein:
        the electrical by-pass is embedded in the clamp body, and
        the deactivated RFID tag becomes activated when the electrical by-pass becomes nonconductive upon an abnormal condition, and wherein:
            when the first mating surface and the second mating surface are in contact by being pressed together by the clamp body, the clamp body is in a closed position which forms an enclosure and the electrical by-pass is conductive such that the deactivated RFID remains deactivated, and
            when the first mating surface and the second mating surface are separated the clamp body is in an open position and the electrical by-pass is nonconductive such that the deactivated RFID tag becomes activated.

2. A smart aerospace structure comprising:
    a deactivated Radio-frequency identification (RFID) tag comprising an integrated circuit (IC) and an electrical by-pass wherein:
        the electrical by-pass is conductive,
        the electrical by-pass is in parallel with the IC, and
        the deactivated RFID tag becomes activated when the electrical by-pass becomes nonconductive upon an abnormal condition, wherein:
            the abnormal condition comprises an impact, and
            the electrical by-pass comprises a breakable trace configured to break upon the impact; wherein when the breakable trace breaks, the electrical by-pass is nonconductive, and wherein the breakable trace comprises a shock trigger switch having a moving element that moves in a shock direction upon impact.

3. A smart aerospace structure comprising:
a deactivated Radio-frequency identification (RFID) tag comprising an integrated circuit (IC) and an electrical by-pass wherein:
the electrical by-pass is conductive,
the electrical by-pass is in parallel with the IC, and
the deactivated RFID tag becomes activated when the electrical by-pass becomes nonconductive, wherein:
the electrical by-pass comprises a reactive material configured to react to chemical species resulting from a thermal event above a specified temperature of a monitored material, and wherein when the reactive material reacts, the electrical by-pass is nonconductive.

4. A smart aerospace structure comprising:
a deactivated Radio-frequency identification (RFID) tag comprising an integrated circuit (IC) and an electrical by-pass wherein:
the electrical by-pass is conductive,
the electrical by-pass is in parallel with the IC, and
the deactivated RFID tag becomes activated when the electrical by-pass becomes nonconductive, wherein:
the electrical by-pass comprises a melting material configured to melt during a thermal event above a specified temperature of a monitored material, and wherein when the melting material melts, the electrical by-pass is nonconductive.

5. A smart aerospace structure comprising:
a deactivated Radio-frequency identification (RFID) tag comprising an integrated circuit (IC) and an electrical by-pass wherein:
the electrical by-pass is conductive,
the electrical by-pass is in parallel with the IC, and
the deactivated RFID tag becomes activated when the electrical by-pass becomes nonconductive;
a composite material, wherein:
the electrical by-pass comprises a breakable trace imprinted upon a surface of the composite material or embedded in the composite material and configured to break upon a formation of a crack in the composite material, and wherein when the breakable trace breaks, the electrical by-pass is nonconductive.

* * * * *